United States Patent [19]

Lagarde et al.

[11] Patent Number: 4,929,460

[45] Date of Patent: May 29, 1990

[54] ELASTOMERIC SILICONE BINDING THREADS FOR COOKABLE FOODSTUFF ITEMS

[75] Inventors: Robert Lagarde, Feyzin; Daniel Ariagno, Craponne; Jacques Nys, Le Chesnay, all of France

[73] Assignee: Rhone-Poulenc Specialites Chimiques, Courbevoie, France

[21] Appl. No.: 416,403

[22] Filed: Oct. 3, 1989

Related U.S. Application Data

[60] Division of Ser. No. 338,559, Apr. 14, 1989, which is a continuation of Ser. No. 939,031, Dec. 8, 1986, abandoned.

[30] Foreign Application Priority Data

Dec. 6, 1985 [FR] France ................................ 85 18287

[51] Int. Cl.$^5$ ........................ B65B 25/06; B65B 25/22
[52] U.S. Cl. .................................. 426/420; 426/129; 426/132; 426/113; 426/415
[58] Field of Search ........................ 426/129, 132, 420

[56] References Cited

U.S. PATENT DOCUMENTS 3,307,956 3/1967 Chiu et al. .
3,781,400 12/1973 Couchoud et al. .

*Primary Examiner*—James C. Cannon
*Attorney, Agent, or Firm*—Burns, Doane, Swecker & Mathis

[57] ABSTRACT

Foodstuff items to be cooked, e.g., meats and boned poultry, are bound or wrapped in fibrous silicone elastomeric bindings, e.g., ties or nets, to maintain structural integrity during cooking. After cooking, such bindings have not decomposed, are not adhered to the foodstuff item, and have retained their elasticity.

11 Claims, No Drawings

ELASTOMERIC SILICONE BINDING THREADS FOR COOKABLE FOODSTUFF ITEMS

This application is a divisional of application Ser. No. 338,559, filed Apr. 14, 1989, which is a continuation of Ser. No. 939,031, filed Dec. 8, 1986, and now abandoned.

BACKGROUND OF THE INVENTION

1. Field of the Invention

The present invention relates to improved binding materials for foodstuff items to be cooked, and especially to elastomeric silicone binding threads for cookable meats and poultry.

2. Description of the Prior Art

Certain foodstuff products, notably meat items such as roasts and poultry, where appropriate boned, have to be tied before cooking, to maintain their shapes, with thread or string binding which is arranged manually or by machine. In the latter case, the thread is frequently knitted beforehand in the form of a net.

The string which forms the net has to possess a number of properties to be suitable for use in automated machinery:

(i) it must be sufficiently elastic, at room temperature and when hot, as to snugly fit the wide variety of different sizes of the items or articles to be packaged, and maintain shape integrity by compression, when both cold and hot, of the different pieces of meat constituting these articles, especially in the case of boned poultry;

(ii) it must possess, when both cold and hot, physical properties sufficient to withstand the strains and rigors to which it is subjected during knitting of the net, during passage through the automatic packaging machine and also during cooking, and such a thread must possess, in particular, adequate tear strength, shear strength, breaking strength and resistance to elongation;

(iii) it must satisfy legal standards relating to materials in contact with foodstuffs;

(iv) it must be insensitive, when both cold and hot, to UV radiation, oxygen, ozone, microwaves and animal and vegetable fats;

(v) it must be, where appropriate, transparent and colorless, and remain so after cooking for reasons of attractive appearance and presentation;

(vi) it must, above all, possess good heat resistance, at least up to 250° C., the maximum temperature of most ovens for cooking food, and possess a satisfactory appearance after cooking and not stick to the meat. In addition, in cases where the thread has been overheated, it is necessary that the degradation products of the thread be nontoxic when ingested into the human body.

Threads or strings for meat items to be roasted have long been proposed to this art. For example, strings made from plant fibers have thus been used, which possess the major drawback of being inelastic and, consequently, of cutting into the meat and, in particular, of being unsuited for use in the form of threads and nets in automatic packaging machines.

Such string is being replaced in industrial installations by a hydrocarbon-based natural or synthetic rubber latex thread.

However, this type of thread is degraded when heated to temperatures of 70° C. and above, and loses its elasticity and mechanical characteristics, and the fumes originating from its degradation are strong irritants to the throat and the respiratory tract and can possess some degree of toxicity. Moreover, since these threads do not have textile appearance and handle, and the nets made therefrom also do not have cohesion and sufficient resistance to elongation, it has been proposed to cover these threads in a polyamide sheath.

This covering admittedly provides the requisite cohesion and resistance to elongation, but it is a very expensive operation and, in addition, the polyamide thread has a very unsatisfactory appearance after cooking, sticks to the meat and is degraded to chemicals which may be toxic.

Hence, serious need exists in this art for a binding material, especially a string, thread or fiber, for packaging foodstuff products to be cooked, which does not possess the disadvantages and drawbacks of the known fibrous materials useful for such purpose, while at the same time exhibiting the combination of physiochemical properties listed hereinabove.

SUMMARY OF THE INVENTION

Accordingly, a major object of the present invention is the provision of an improved binding material for foodstuffs to be cooked, notably meat items.

Briefly, the present invention features foodstuff bindings comprised of a silicone elastomer. This invention also features the packaging of foodstuff items utilizing the subject elastomeric silicone ties and the foodstuff items, per se, thus packaged.

DETAILED DESCRIPTION OF THE PREFERRED EMBODIMENTS OF THE INVENTION

More particularly according to the present invention, the subject elastomeric silicone binding material preferably comprises an extruded thread or fiber, but it can also be in the shape of strips or ribbons cut into pieces. The thickness of the silicone elastomer thread or fiber, or strip, can vary over wide limits but, for the application intended herein, it advantageously ranges from 0.1 to 2 mm, and preferably from 0.3 to 1 mm, especially in the case where the thread is single-stranded.

It is also intended to use simple threads or fibers, which may optionally be hollow, and also plaited multistranded threads, the number of strands advantageously ranging from 2 to 6.

These threads can be used as such for tying together the foodstuff articles to be cooked, or can be knitted into nets which can be used manually, or, alternatively, they comprise shapes and sizes suitable for packaging machines for foodstuff articles. These nets can be knitted from threads which have different mechanical properties, in particular, some threads of the net can be virtually inelastic.

To produce a thread or fiber by extrusion, an extrudable organopolysiloxane composition is selected; in the case where it is desired to fabricate threads having, after crosslinking and heat and/or mechanical treatment, the required physicochemical properties, this composition is extruded through a single-stranded or double-stranded die orifice of the desired diameter and the extruded thread is passed through a tunnel oven heated to a temperature of from 100° to 850° C. for the purpose of crosslinking it.

In a preferred embodiment of the invention, the silicone composition is extruded in a vertical or horizontal extruder, and is preferably coated with talc as it emerges from the die to prevent it from sticking to the conveyor belt. This conveyor belt passes through a vulcanization tunnel oven, the atmosphere of the oven being at from 300° to 400° C., or passes rapidly (in a few seconds) through an oven adjusted to from 750° to 850° C. In place of this tunnel oven, the conveyor belt can also pass through a bath of molten salt or a bed of fluidized solid particles, or can be exposed to high energy radiation (UV and electron beams). The thread is then postcured at a temperature of from 150° to 220° C. for several hours, for example, at least 3 hours at 180–200° C. In this process, the thread can be stretched, but this is not necessary.

The die can have several groups of extrusion orifices in the form of circular slits and, in this case, the extrusion face of the die can be maintained in contact with a liquid which is not a solvent for the organopolysiloxane used, and causes little or no swelling thereof, for the purpose of producing a multi-stranded thread. This solvent is advantageously selected from dimethylformamide, dimethyl sulfoxide and methanol, as described in French Patent No. 2,164,061.

Preferably, the thread has a breaking strength per kilometer greater than 1.2 and an elongation at break greater than 250%, preferably greater than 400%.

Organopolysiloxane compositions which can be hardened to suitable elastomers and extrusion processes for producing the threads useful according to the present invention are described in detail in French Patent No. 1,017,582, the Patent of Addition No. 64,459 to said French Patent No. 1,017,582, corresponding to British Patents Nos. 682,540 and 726,479, and in French Patents Nos. 1,602,332 (corresponding to U. S. Pat. No. 3,781,400), 2,068,852, 2,102,707 and 2,164,061.

Those skilled in the silicone art will have no difficulty in selecting an organopolysiloxane composition and in adapting the heat and mechanical treatment of the extruded thread in accordance with the physicochemical properties desired for the elastomer constituting the binding according to the invention.

For the foodstuff application consistent herewith, organopolysiloxane compositions are preferably selected which provide elastomers which are highly elastic in nature and have high tear and breaking strength, in view of the small cross-section of the bindings, especially the threads. Among these compositions, advantageously used are heat-vulcanizable organopolysiloxane compositions containing at least one diorganopolysiloxane gum having methyl and vinyl radicals and optionally other radicals, preferably 3,3,3-trifluoropropyl and/or phenyl radicals, charged with an optionally treated pyrogenic silica and a crosslinking system including either an organic peroxide or the combination of a linear or resinous hydrogenomethylpolysiloxane, optionally comprising dimethylsiloxane units, and a catalytically effective amount of a catalyst containing platinum or a metal of the platinum family (for example, rhodium, osmium, ruthenium or rhenium). The compositions of the above type, and crosslinking thereof with a peroxide, are well known and are described, for example, in U. S. Pat. Nos. 3,660,345, 3,652,475 and 4,444,940.

The compositions of the above type, and crosslinking thereof by means of the combination of a hydrogenoorganopolysiloxane and a catalytically effective amount of a catalyst containing platinum, are also well known and are described, for example, in French Patents Nos. 1,360,908, 1,375,869 and 1,528,465.

Hereinafter, except where otherwise indicated, all parts and percentages are given by weight.

A preferred organopolysiloxane composition which crosslinks by means of a peroxide, and more especially suitable for the foodstuff bindings according to the invention, advantageously comprises:

(A) 100 parts of a mixture of two vinyl-containing ethylpolysiloxane gums, including:
  (1) 80 to 95 parts of a dimethylpolysiloxane gum blocked at each end of the polymer chain by a dimethylvinylsiloxy unit and having a viscosity of from 1,000,000 to 50,000,000 mPa.s at 25° C., up to 40 mol% of the methyl radicals being capable of being replaced by a radical selected from among 3,3,3-trifluoropropyl and phenyl radicals;
  (2) 20 to 5 parts of a dimethylmethylvinylpolysiloxane gum blocked at each end of the polymer chain by a trimethylsiloxy unit, having a content in vinyl units of from 0.5 to 4% by weight and a viscosity of from 100,000 to 1,000,000 mPa.s at 25° C., up to 40 mol% of the methyl radicals being capable of being replaced by radicals selected from among phenyl and 3,3,3-trifluoropropyl radicals;
(B) 10 to 60 parts of a reinforcing silica selected from among precipitated silicas and pyrogenic silicas;
(C) 0.1 to 5 parts of an organic peroxide;
(D) 0 to 10 parts of an anti-structure agent which comprises a dimethylpolysiloxane oil having a viscosity of less than 5,000 mPa.s at 25° C., including recurring units of the formula $(CH_3)_2SiO$ and blocked at each end of the polymer chain by a hydroxyl radical or an alkoxy radical having from 1 to 6 carbon atoms, inclusive:
(E) from 0 to 2 parts, and preferably from 0.02 to 2 parts, of an organosilicon compound bearing at least one acryloxyalkyl or methacryloxyalkyl group. Gammamethacryloxypropyltrimethoxysilane is the preferred such compound.

The gums (A) and the oils (D) are commercially available from the silicone producers. The processes for the preparation of same are well known. The pyrogenic silicas used preferably possess a BET surface area of at least 150 m$^2$/g and can optionally be treated before they are incorporated, for example with hexamethyldisiloxane, octamethylcyclotetrasiloxane, methylchlorosilanes or dimethylvinylchlorosilane.

Exemplary of the peroxides (C), representative are, in particular, benzoyl peroxide, 2,5-dimethyl-2,5-di-tert-butylperoxyhexane, tert-butyl perbenzoate, 2,4-dichlorobenzoyl peroxide, di-tert-butyl peroxide, dicumyl peroxide and tert-butylperoxyisopropyl carbonate.

A preferred organopolysiloxane composition which crosslinks by means of a platinum catalyst, and more especially suitable for the foodstuff bindings according to the invention, advantageously comprises:

(A) 100 parts of a dimethylmethylvinylpolysiloxane gum blocked at each end of the polymer chain by a trimethylsiloxy unit, containing 300 to 3,000 ppm of vinyl radicals and having a viscosity of from 1,000,000 to 50,000,000 mPa s at 25° C., up to 40 mol% of the methyl radicals being capable of being replaced by a radical selected from among phenyl and 3,3,3-trifluoropropyl radicals;

(B) 10 to 60 parts of a reinforcing silica selected from among precipitated silicas and pyrogenic silicas;

(C) 0.1 to 5 parts of a substantially linear methylhydrogenosiloxane oil, blocked at each end of the polymer chain by a trimethylsiloxy unit, containing in its polymer chain principally methylhydrogenosiloxy units and having a viscosity of from 1 to 300 mPa.s at 25° C.;

(D) a catalytically effective amount (generally from 10 to 10,000 ppm, calculated as weight of metal) of a catalyst containing platinum;

(E) optionally, an effective amount of an inhibitor of the catalytic action of the platinum under cold conditions, this amount being insufficient to inhibit the catalytic action of the platinum at the vulcanization temperature;

(F) 0 to 15 parts of an anti-structure agent which comprises a dimethylpolysiloxane oil having a viscosity less than 5,000 mPa.s at 25° C., including recurring units of the formula $(CH_3)_2SiO$ and blocked at each end of the polymer chain by a hydroxyl radical or an alkoxy radical having from 1 to 6 carbon atoms, inclusive;

(G) from 0.1 to 5 parts of a methylvinylcyclopolysiloxane.

The gums (A) and the materials (C), (D) and (G) are commercially available from silicone producers.

The platinum catalyst (D) can be introduced as such or in the form of platinic or platinous chloride, or hexahydrated or anhydrous chloroplatinic acid. Other salts or complexes of platinum can, of course, also be used.

The platinum inhibitors (E) can be, for example, an organic peroxide, benzotriazole, an aminated silane such as gamma-aminoethylaminopropyltrimethoxysilane, acetylenic alcohols, and the like.

The compound (G) is preferably ethylvinylcyclotetrasiloxane.

To either type of preferred organopolysiloxane composition suitable for the elastomeric silicone bindings according to the invention, it is possible to add cerium oxide or hydroxide and/or an alkaline earth metal oxide or hydroxide and titanium oxide, optionally in combination with a platinum compound which, in addition to its catalytic action in the case of the presence of a methylhydrogenosiloxane, improves the flame resistance of the elastomer. The addition of these different additives is described in U. S. Pat. Nos. 3,514,424, 3,635,874, 3,711,520 and 3,821,140.

In order to further illustrate the present invention and the advantages thereof, the following specific examples are given, it being understood that same are intended only as illustrative and in nowise limitative.

EXAMPLE 1

Using a mixer, an intimate admixture was formed from the following ingredients:

(i) 93 parts of a dimethylpolysiloxane gum blocked at each end of its polymer chain by a dimethylvinylsiloxy unit, having a viscosity at 25° C. of 10,000,000 mPa.s and having a content of vinyl radicals of 120 ppm;

(ii) 7 parts of a dimethylmethylvinylpolysiloxane gum blocked at its polymer chain ends by a trimethylsiloxy unit, containing 2% by weight of vinyl radicals and having a viscosity at 25° C. of 400,000 mPa.s;

(iii) 1 part of a dimethylpolysiloxane oil having a viscosity of 50 mPa.s at 25° C., blocked at both polymer ends by a hydroxyl radical linked to the terminal silicon atom;

(iv) 0.1 part of gammamethacryloxpropyltrimethoxysilane; and (v) 30 parts of a pyrogenic silica, Aerosil 300 ® having a BET surface area of 300 $m^2/g$, treated beforehand with octamethylcyclotetrasiloxane.

The mixing was terminated 30 minutes after the introduction of the silica was complete. The freshly prepared homogeneous composition was removed from the mixer and transferred to a two-roll mill, and one part of 2,4-dichlorobenzoyl peroxide per 100 parts of the mixture of the two vinyl-containing gums was incorporated therein using this mill.

The homogeneous mixture obtained was introduced into a horizontal extruder in which the diameter of the orifice of the die was 0.7 mm and the extrusion rate was 30 m/min. The thread obtained was coated with talc in continuous fashion by passage inside a perforated cylinder rotating in a bath of talc, before being transferred into the vulcanization oven. As it emerged from the talc-coating cylinder, the thread was placed on an endless metal conveyor belt moving at a speed of 30 m/min, this belt passing through a chamber 5 m long, heated by infrared radiation to an average temperature of 340° C. As it emerged from the oven, the thread was wound uniformly on a perforated drum with the aid of a guiding system. This drum was 80 mm in diameter and 40 cm long, and rotated at a peripheral velocity of 30 m/min. The final thickness of the wound thread did not exceed a radial height of 2 cm.

The postcuring of the thread was carried out directly with this winding drum at a temperature of 200° C. for a period of 4 hours in a forced-draught oven.

The thread thereby obtained possessed an elongation at break of 650% and a breaking strength per kilometer of 1.35.

Using the thread thereby obtained, a net was knitted having meshes of 1 cm sides, in which a 2-kg boned turkey roast was wrapped. After cooking for 1 hour, 30 min, at 250° C., it was found that the silicone thread was intact, uncolored, did not adhere to the meat and had retained its elasticity.

EXAMPLE 2

The composition was introduced in two parts, A and B, which were mixed when required at the time of use using a two-roll mill: the parts A and B were made from the same masterbatch MB.

Preparation of the MB

The following materials were mixed in a mixer:

(i) 100 parts of a dimethylmethylvinylpolysiloxane gum blocked at both polymer ends by a trimethylsiloxy unit and having a vinyl content of 720 ppm, and a viscosity of 10,000,000 mPa.s at 25° C.;

(ii) 1.4 parts of a dimethylpolysiloxane oil having a viscosity of 50 mPa.s at 25° C., blocked at both polymer ends by a hydroxyl radical linked to the terminal silicon atom;

(iii) 45 parts of a pyrogenic silica, Aerosil 300 ® having a BET surface area of 300 $m^2/g$, treated beforehand with octamethylcyclotetrasiloxane.

The mixing was terminated 30 minutes after the introduction of the silica.

Preparation of the part A by mixing in a mixer:

(i) 100 parts of MB;
(ii) 0.3 part of methylvinylcyclotetrasiloxane;
(iii) 0.6 part of a paste prepared from Aerosil 300 ®, isopropanol and chloroplatinic acid containing 0.2% of platinum metal.

Preparation of the part B by mixing in a mixer:

(i) 100 parts of MB;
(ii) 1 part of linear methylhydrogenopolysiloxane having a viscosity of 45 mPa.s at 25° C., blocked at both polymer ends by a trimethylsiloxy unit and containing in its chain mainly methylhydrogenosiloxy units.

After mixing equal parts (50:50) of parts A and B, the composition according to the invention was spun without stretching, using the apparatus described in Example 1, except that the orifice of the die was 0.5 mm, the extrusion rate was 40 m/min and the average temperature of the oven was 380° C.

The thread was also postcured at a temperature of 200° C. for a period of 4 hours.

The thread thereby obtained possessed an elongation at break of 550 % and a strength per kilometer of 1.45.

Using the thread thereby obtained, a net was knitted having meshes of 1.5 cm sides, in which a 3-kg veal roast, about 15 cm in diameter, was wrapped.

After cooking for two hours at about 240° C., it was found that the silicon thread was intact, colorless, did not adhere to the meat and had retained its elasticity.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for wrapping a food product to be cooked comprising the steps of: providing a tie comprising a silicone elastomer capable of being heated up to 250° C.; wrapping said food with said provided tie; and securing said tie to said food product.

2. The process according to claim 1, wherein said tie is a cut strip.

3. The process according to claim 1, wherein said tie is a yarn.

4. The process according to claim 1, wherein said tie is a strand.

5. The process according to claim 3, wherein said yarn has a kilometric strength higher than 1.2 and an elongation at rupture higher than 250%.

6. The process according to claim 4, wherein said strand has a kilometric strength higher than 1.2 and an elongation at rupture higher than 250%.

7. The process according to claim 6, wherein said yarn is comprised of a plurality of said strands.

8. The process according to claim 1, wherein said silicone elastomer comprises the reaction product of the hot vulcanization of an organo-polysiloxane composition containing at least one diorganopoly-siloxane gum, the organic radicals of which are chosen form among methyl and vinyl radicals and optionally phenyl and 3,3,3-trifluoropropyl radicals, a pyrogenic and/or a precipitated silica, and a cross-linking system chosen from among an organic peroxide and a combination of a hydrogenomethylpolysiloxane and a catalytically effective quantity of a catalyst of the platinum family.

9. Process according to claim 1, wherein the organic polysiloxane composition contains:

A. 100 parts of a mixture of two vinyl methylpolysiloxane gums formed of:
  1. 80 to 85 parts of dimethylpolysiloxane gum blocked at both of its ends by a dimethylvinylsiloxy unit and of a viscosity between 1,000,000 and 50,000,000 mPa.s at 25° C., with up to 40% molar of methyl radicals being replaceable by a radical chosen from 3,3,3-trifluoro propyl and phenyl radicals,
  2. 20 to 5 parts of dimethylmethylvinylpolysiloxane gum blocked at each end by a trimethylsiloxy unit, having a viscosity between 100,000 and 1,000,000 mPa.s at 25° C., with up to 40% molar of methyl radicals being replaceable by radicals chosen from among phenyl and 3,3,3-trifluoro propyl radicals,
B. 10 to 60 parts of a reinforcing silica chosen from among precipitation and pyrogenic silica,
C. 0.1 to 5 parts of an organic peroxide,
D. 0 to 10 parts of antistructural agent, which is a dimethylpolysiloxane oil with a viscosity of less than 5,000 mPa.s at 25° C., formed of a chain of units of the formula $(CH_3)_2 SiO$ and blocked at each end by a hydroxyl or alkoxy radical having 1 to 6 carbon atoms,
E. 0 to 2 parts of an organosilica compound carrying at least one acryloxyalkyl or methacryloxytakyl group.

10. Process according to claim 1 wherein the organopolysiloxane compound contains:

A. 100 parts of a dimethylmethylvinylpolysiloxane blocked at each end by a trimethylsiloxy unit having 300 to 3,000 ppm vinyl radicals with a viscosity between 1,000,000 and 50,000,000 mPa.s at 25° C., with up to 40 molar % of the methyl radicals being replaceable by a radical chosen from among phenyl and 3,3,3-trifluoro propyl radicals,
B. 10 to 60 parts of a reinforcing silica chosen from among precipitation and pyrogenic silica,
C. 0.1 to 5 parts of an essentially linear methylhydrogenosiloxane oil, blocked at each end by a trimethylsiloxy unit, containing in its chain essentially methylhydrogenosiloxy units and having a viscosity of between 1 and 300 mPa.s at 25° C.,
D. a catalytically effective quantity of a platinum catalyst,
E. Optionally an effective quantity of an inhibitor of the catalytic action of platinum at cold, said quantity being insufficient to inhibit the catalytic action of platinum at the vulcanization temperature,
F. 0 to 15 parts of anti-structural agent, which is a dimethylpolysiloxane oil with a viscosity less than 5,000 mPa.s at 25° C., formed by a chain of units of formula $(CH_3)_2 SiO$ and blocked at each end by a hydroxyl or alkoxy unit having 1 to 6 carbon atoms,
G. 0.1 to 5 parts of a methylvinylcyclopolysiloxane.

11. Process according to claim 10, wherein said catalytically effective quantity of platinum catalyst is between 10 and 10,000 ppm.

* * * * *